United States Patent
Andrus et al.

(10) Patent No.: US 8,458,314 B1
(45) Date of Patent: Jun. 4, 2013

(54) SYSTEM AND METHOD FOR OFFLOADING IT NETWORK TASKS

(75) Inventors: Frank D. Andrus, Sanbornton, NH (US); Paula Jane Dunigan, Deerfield, NH (US); Todd R. Wohlers, Rochester, NH (US); Paul D. Playdon, Rochester, NH (US); Alan R. Hackert, Strattford, NH (US)

(73) Assignee: Bradford Networks, Inc., Concord, NH (US)

( * ) Notice: Subject to any disclaimer, the term of this patent is extended or adjusted under 35 U.S.C. 154(b) by 226 days.

(21) Appl. No.: 12/916,682

(22) Filed: Nov. 1, 2010

Related U.S. Application Data (60) Provisional application No. 61/256,401, filed on Oct. 30, 2009.

(51) Int. Cl.
*G06F 15/173* (2006.01)

(52) U.S. Cl.
USPC ............ 709/223; 709/203; 709/217; 709/224

(58) Field of Classification Search
USPC .......................... 709/223, 224, 203, 217, 219
See application file for complete search history.

(56) References Cited

U.S. PATENT DOCUMENTS

| | | | |
|---|---|---|---|
| 6,289,385 B1 * | 9/2001 | Whipple et al. | 709/229 |
| 7,149,738 B2 * | 12/2006 | Kumar et al. | 707/694 |
| 8,019,992 B2 * | 9/2011 | Chan et al. | 713/166 |
| 2002/0194045 A1 * | 12/2002 | Shay et al. | 705/8 |
| 2003/0023662 A1 * | 1/2003 | Yaung | 709/106 |
| 2003/0126003 A1 * | 7/2003 | vom Scheidt et al. | 705/8 |
| 2004/0010571 A1 * | 1/2004 | Hutchinson et al. | 709/220 |
| 2004/0068424 A1 * | 4/2004 | Lee et al. | 705/7 |
| 2005/0060397 A1 * | 3/2005 | Barthram et al. | 709/223 |
| 2006/0242261 A1 * | 10/2006 | Piot et al. | 709/217 |
| 2008/0109396 A1 * | 5/2008 | Kacin | 707/1 |
| 2008/0235045 A1 * | 9/2008 | Suzuki et al. | 705/1 |
| 2009/0070442 A1 * | 3/2009 | Kacin et al. | 709/221 |
| 2009/0132647 A1 * | 5/2009 | Colby et al. | 709/203 |
| 2009/0164649 A1 * | 6/2009 | Kawato | 709/229 |
| 2009/0222299 A1 * | 9/2009 | Clemenson et al. | 705/7 |
| 2010/0042620 A1 * | 2/2010 | Bailey et al. | 707/5 |
| 2010/0223557 A1 * | 9/2010 | Kenney et al. | 715/736 |
| 2011/0113008 A1 * | 5/2011 | Jafri et al. | 707/608 |
| 2011/0208812 A1 * | 8/2011 | Bimson et al. | 709/203 |
| 2011/0258698 A1 * | 10/2011 | Ontaneda et al. | 726/21 |

* cited by examiner

*Primary Examiner* — LaShonda Jacobs
(74) *Attorney, Agent, or Firm* — Maine Cernota & Rardin (57) ABSTRACT

A system and method for network control supporting network endpoints including devices and users that delegates control from the Administrator to Sponsors, leveraging their particular skills. For embodiments, Profiles comprise a set of specifications which define the scope of control or authority. Their application comprises associating Templates/Rules with the Profiles. The Administrator creates Sponsor Users (Sponsors) from users with administrative privileges. The Administrator delegates network management workload by assigning Profiles to Sponsors, defining Sponsors' control. Sponsors thereby manage pieces of the overall workload. The Administrator can also view reports and audit trails for both the Sponsors and network resources.

20 Claims, 7 Drawing Sheets

GUEST USER ACCESS

FIG. 1

ADMINISTRATOR SETUP

FIG. 2

SPONSOR ACTIONS

FIG. 3

ENDPOINT ELEMENT CONTROL DELEGATION STEPS

MANAGEMENT OF DEVICE ACCESS OF NETWORK SERVICES

FIG. 7

SYSTEM AND METHOD FOR OFFLOADING IT NETWORK TASKS

RELATED APPLICATIONS

This application claims the benefit of U.S. Provisional Application No. 61/256,401, filed Oct. 30, 2009, and is herein incorporated in its entirety by reference.

FIELD OF THE INVENTION

The invention relates to network management, in particular, offloading Administrator information technology (IT) network tasks to people such as business/department heads or automated mechanisms within the system.

BACKGROUND OF THE INVENTION

The workload of an IT manager has increased significantly with today's mobile technology and the mobility of employees, guests and other network users. Each network item demands individual attention from a network administrator to be configured, added to the network and provided with permissions.

With the explosion of new endpoint device technology and the ever increasing mobile user population, the need to understand who and what is connecting to a corporate network has become critical.

IT departments struggle to ensure that mission-critical network resources are both operational and secure, while allowing network access for endpoint devices, mobile devices, biomedical devices, security cameras, etc. IT departments are also responsible for ensuring that mobile users, employees, partners, guests and contractors do not misuse network resources, wrongly distribute intellectual property assets or otherwise violate usage policies. In addition, IT is ultimately responsible for making sure that network users can accomplish valid tasks with minimal interruptions. This requires IT to be able to dynamically identify, manage and secure a wider variety of devices and users on the network than was previously required.

Guest access has also become a crucial enabler of business on today's network. At the same time, the distinction between guests and employees has become more difficult to define. Guests might include customers or clients, business partners, outside vendors, contractors, and others—each with unique access requirements. The growing need for guest access has put yet another strain on an already over-tasked IT department, driving the need for IT to be able to automate and/or delegate the process of provisioning guest access.

Furthermore, organizational boundaries between business units are becoming less defined. Which department owns which resources? What employee belongs to what department? As organizational silos start to fade, the static silos of security policies become less effective and harder to maintain. Ideally, a security solution that will adapt along with the organization's changing needs is required.

What is needed is a network control system supporting network endpoints including devices and users that delegates control from the Administrator to Sponsors, leveraging their particular skills.

SUMMARY OF THE INVENTION

To alleviate the burden on the IT manager, tools are implemented to sort items requiring service, send those service requests to department heads to be managed, and provide a limited access framework within which department heads can work. The following terms as described will be used. Administrators delegate workload to Sponsors, view reports and audit trails. Sponsors administer control over endpoints requiring network resources. Profiles define the scope and limitations of a Sponsor's control. Templates/Rules are a set of rules or patterns that define the scope of the IT Task, limitations of the endpoint and provide an association between endpoint and Sponsor. Endpoints are devices or Users requesting access to the network.

A Network Administrator has the responsibility of delegating the network management workload. In embodiments, the Administrator does this by the following steps: 1) Creating Templates that represent an IT task such as allowing guests on the network or allowing devices on the network and provisioning on the network. Templates can include network accesses and duration, type of network access, information about the user of device, etc.; 2) Creating Profiles to assign to Sponsors which are composed of a set of specifications. The specifications define the scope of allowable actions for the Sponsor. Profiles can contain the type of users and devices that a sponsor can manage and the privileges assigned to a sponsor, etc.; 3) Associating Templates with Profiles, which Sponsors can use to control network resources; 4) Creating Sponsors to handle pieces of the overall workload; 5) Associating Profiles with Sponsors; 6) The Sponsor, bound by the limitations of the Profile assigned to them, uses the Templates, assigned to their Profile by the Administrator, to control network resources; and 7) The Administrator can also view reports and audit trails for both the Sponsors and network resources. In embodiments, this includes guests and devices.

Embodiments provide a method for control of network resources supporting network endpoints by delegating control from network administrator to sponsor comprising the steps of: creating templates for users and devices of the network; creating profiles used to control the resources of the network; associating the templates with the profiles; creating at least one the sponsor; associating at least one of the profiles with the sponsor; and controlling of the network resources by the sponsor, using the templates assigned to the sponsor by the network administrator, wherein the sponsor is constrained by the at least one associated profile.

For another embodiment, the step of creating templates comprises: detecting IP range, port on which services are provided, location, and organization unique identifiers (OUIs), whereby endpoint type is determined.

In yet another embodiment, the step of creating profiles comprises: defining which of the templates the sponsor is allowed to use; defining time period of accounts the sponsor is allowed to create; defining days in advance the sponsor is allowed to create accounts; defining whether the sponsor has access to view or modify the accounts they create or accounts others create; defining what types of accounts the sponsor can create; defining which devices the sponsor can manage based on template used to identify the device; defining whether the sponsor can manually register profiled devices; and defining whether the sponsor can delete or disable profiled devices, wherein the profile defines scope and limitations of the sponsor's control.

For an embodiment, the step of associating the templates with the profiles comprises: storing identifiers of the associated templates and the associated profiles for the sponsor In a subsequent embodiment the step of creating at least one the sponsor comprises: the network administrator identifying a type attribute of at least one network user with administrative privileges as sponsor.

In another embodiment, the step of associating at least one of the profiles comprises: storing identifier of at least one the associated profile in network account attribute of the associated sponsor.

In an embodiment, the step of controlling of the network resources by the sponsor comprises: creating guest accounts using the templates in the sponsor's at least one profile; limiting network access by segment; limiting network access by resource; limiting network access based on connection method and location; and limiting network access by time and location.

A further embodiment provides that the sponsor is authorized to create guest accounts.

In yet another embodiment, the template is a guest template comprising: time period that guest user can access the network; role the guest user will be assigned, whereby access to the network is limited; scan policy to enforce compliance of guest's system before allowed on the network; and authentication method to determine how the guest will authenticate to the network.

For yet a further embodiment, the profile comprises: specifications defining templates the sponsor is allowed to use; time period of accounts the sponsor is allowed to create; days in advance the sponsor is allowed to create accounts; permissions for the sponsor access to view or modify accounts they create or accounts others create; and types of accounts the sponsor can create.

Additional embodiments provide that endpoint control delegation comprises: discovering network endpoints requiring services from the network; identifying the network endpoints; categorizing the identified network endpoints; limiting management permission for the categorized network endpoints based on the endpoint categories; and delegating management including the limitations to the sponsor, whereby the network endpoints are controlled by the sponsor.

In a subsequent embodiment, temporary network users (TNUs) are categorized based on template used to create the TNUs' accounts in an access control database of the network, wherein association with the TNU template remains after the account is created.

Another embodiment further comprises: detecting a device; and identifying the device by at least one device identification/placement rule created by the network administrator.

In one other embodiment, the device rule comprises: time period that the device can access the network; role the device will be assigned; device type, based on data returned from the device; where and how the device will be managed within the network; and whether to notify the sponsor that a new device has connected.

Embodiments provide a system for control of network resources supporting network endpoints by delegating control from a network administrator to a network sponsor comprising: in a network database, creating template records for endpoints of the network; in the network database, creating at least one profile used to control the endpoints; associating the templates with the profiles; in the network database, creating at least one sponsor record; associating at least one of the profiles with the sponsor record; and by executing instructions in a microprocessor, controlling of the network resources by the sponsor, using the templates assigned to the sponsor by the network administrator, wherein the sponsor is constrained by the at least one associated profile.

For another embodiment, template rules are created to automatically allow devices on the network with no intervention by the sponsor.

In yet another embodiment, the profile comprises: identification of devices the sponsor can manage based on a template/rule used to identify the device; identifying if the sponsor can manually register profiled devices; and specifying if the sponsor can delete or disable profiled devices.

A further embodiment further comprises: the sponsor profile enabling the sponsor to view devices managed by the sponsor.

In a yet further embodiment, the viewing comprises: time the device connected; type of the device; location of the device; MAC address of the device; IP address of the device; and components connected to the device.

An embodiment is an apparatus for control of network resources supporting network endpoints by delegating control from a network administrator to a network sponsor comprising: a network database containing template records for endpoints of the network, wherein the template comprises a set of rules or patterns defining scope of IT task, limitations of the endpoint and identification of an association between the endpoint and the sponsor; in the network database at least one profile used to control the endpoints; at least one microprocessor executing instructions associating the templates with the profiles; in the network database at least one sponsor record; at least one microprocessor executing instructions associating at least one of the profiles with the sponsor record; and at least one microprocessor executing instructions controlling the network resources by the sponsor, using the templates assigned to the sponsor by the network administrator, wherein the sponsor is constrained by the at least one associated profile.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Invention embodiments categorize and identify endpoints requiring network services. They control endpoints for which network services have been provided. They delegate management of endpoints requiring network services based on prior categorization; and limit management of endpoints based on prior categorization.

Figure 1:
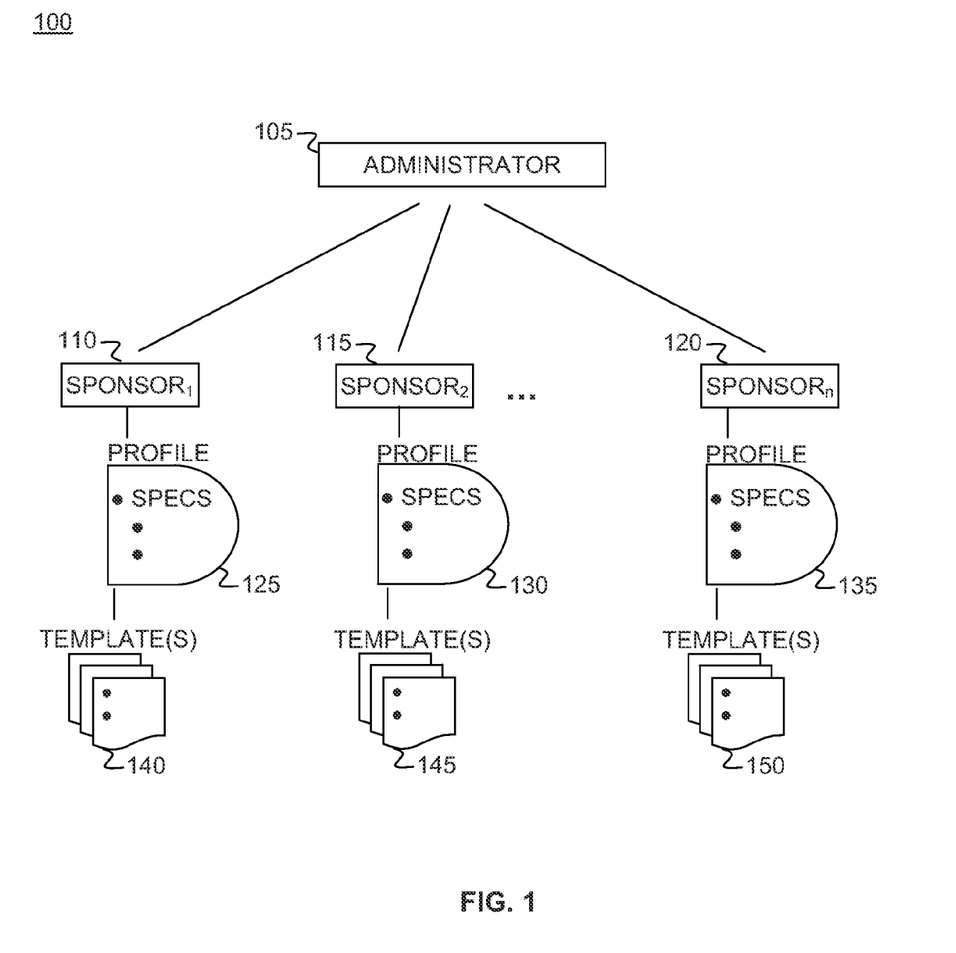
FIG. 1 is a top level diagram illustrating a network management control architecture configured in accordance with one embodiment of the present invention.

FIG. 1 depicts the organization 100 of components controlling the delegation of authority from Network Administrator 105 to Sponsors 110, 115, and 120. Network Administrator 105 delegates workload to Sponsors, views reports and audit trails. Sponsor Users 110, 115, and 120 administer control over network resources. Profiles 125, 130, and 135 are associated with Sponsors 110, 115, and 120, respectively. They define the scope and limitations of a Sponsor's control. Template(s) 140, 145, and 150 are associated with Profiles 125, 130, and 135, respectively. They define the scope and limitations of the IT task. They are used by the Sponsor to manage network endpoints based on the rules used to identify the device. The network endpoints being managed are devices or users requesting access to the network.

Figure 2:
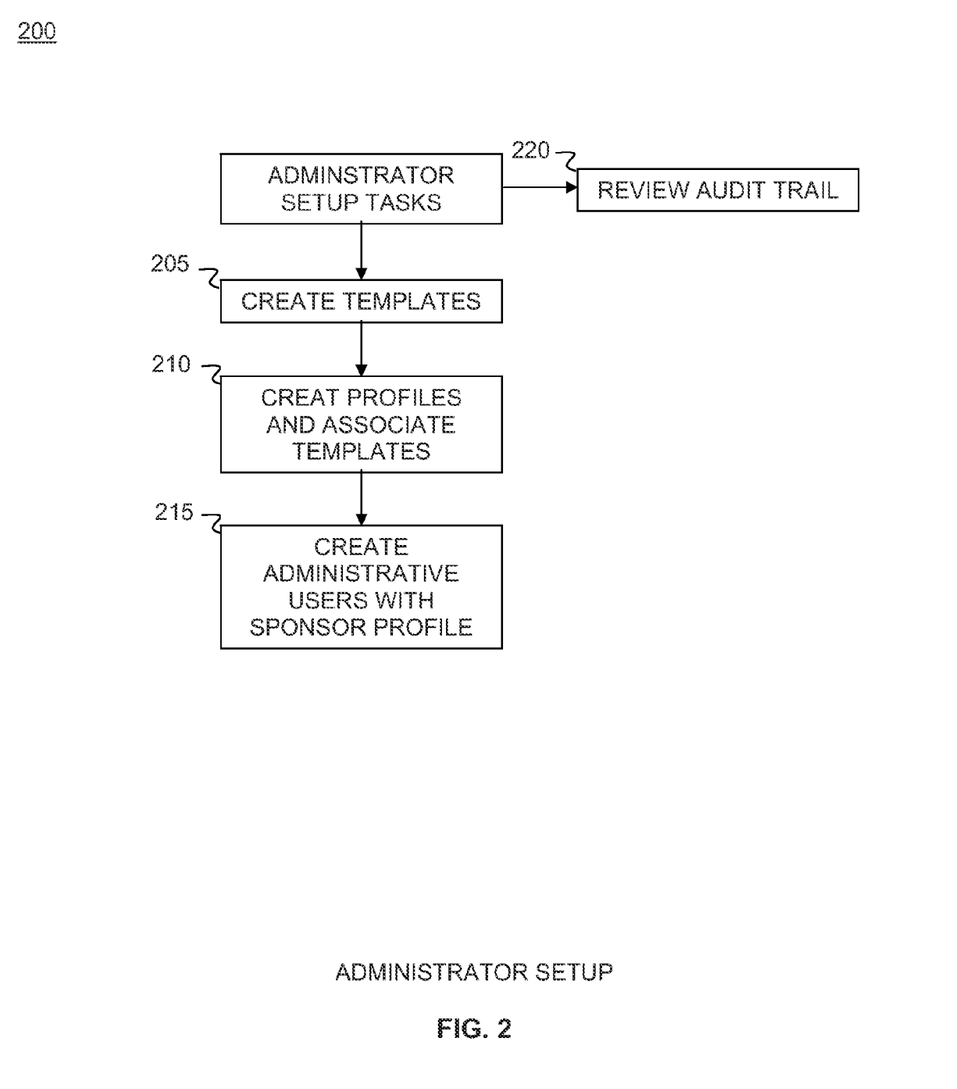
FIG. 2 is a simplified depiction of Administrator setup task blocks configured in accordance with one embodiment of the present invention.

FIG. 2 depicts Administrator setup task blocks 200. For embodiments, this is done by: creating Templates for network users 205; creating Profiles used to control network resources and associating Templates and Profiles 210; creating a Sponsor and assigning one or more Profiles 215; and reviewing the audit trail by the Administrator 220.

Figure 3:
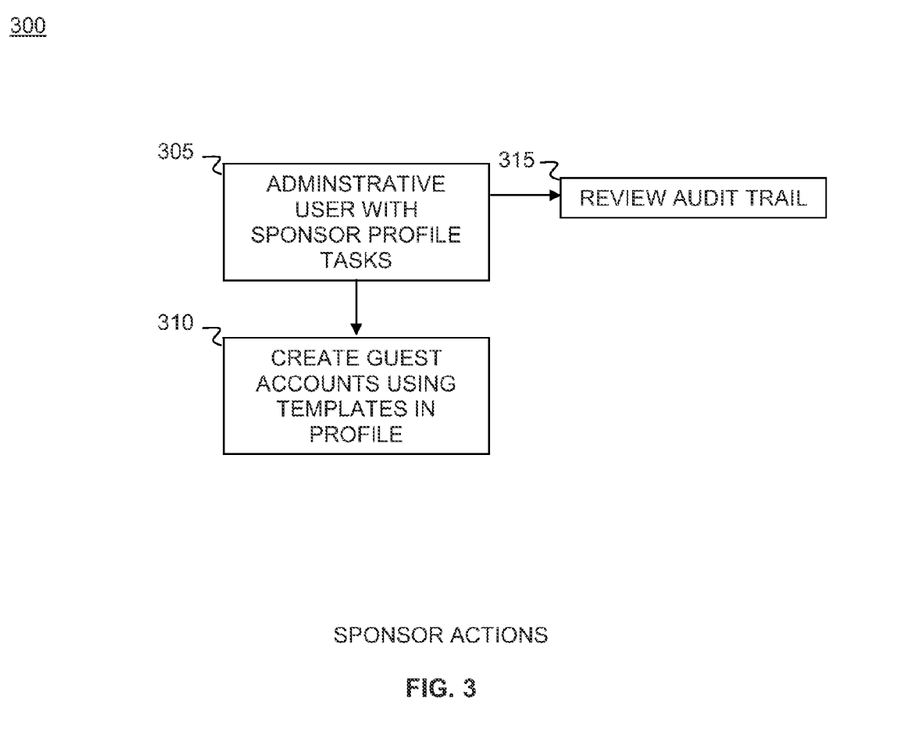
FIG. 3 is a simplified depiction of a task flow of Sponsor actions configured in accordance with one embodiment of the present invention.

FIG. 3 depicts a task flow 300 of Sponsor actions. A Sponsor (an administrative user with an assigned Profile) 305 bound by the limitations of the Profile assigned to them, uses the Templates, assigned to their Profile by the Administrator, to control network resources. This comprises creating guest accounts 310 using Templates in the Sponsor's Profile. The Sponsor can also view reports and audit trails 315 for both the guest accounts they created and network resources over which they have control.

Figure 4:
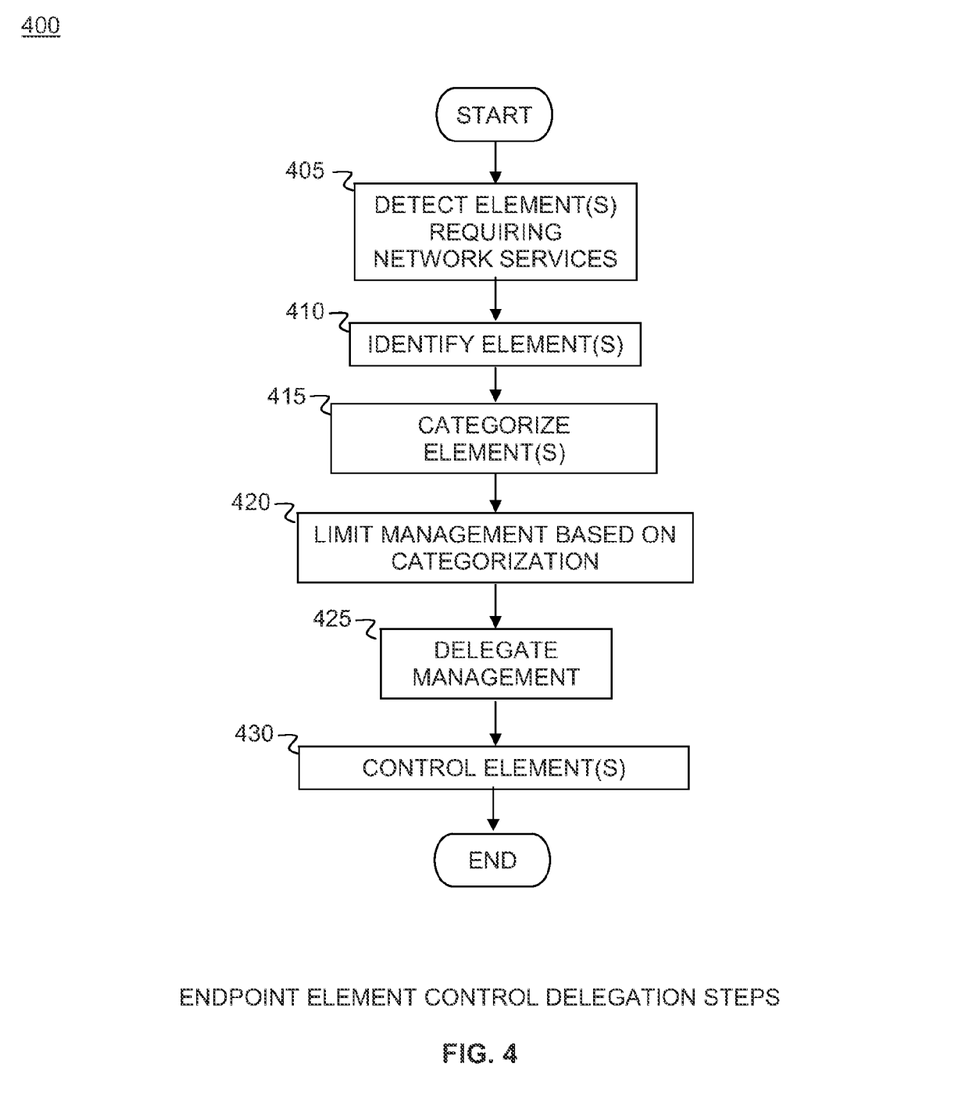
FIG. 4 is a simplified flow chart of a method of delegating network endpoint control configured in accordance with one embodiment of the present invention.

FIG. 4 depicts a simplified flow chart 400 of a method of delegating network endpoint control. Network endpoints requiring services from the network are discovered 405, the network endpoints are identified 410, these identified network endpoints are categorized 415, based on these endpoint categories, management permission for these network endpoints is limited 420, management including these limitations is delegated to Sponsors 425, and the network endpoints are controlled 430 by the Sponsors.

Figure 5:
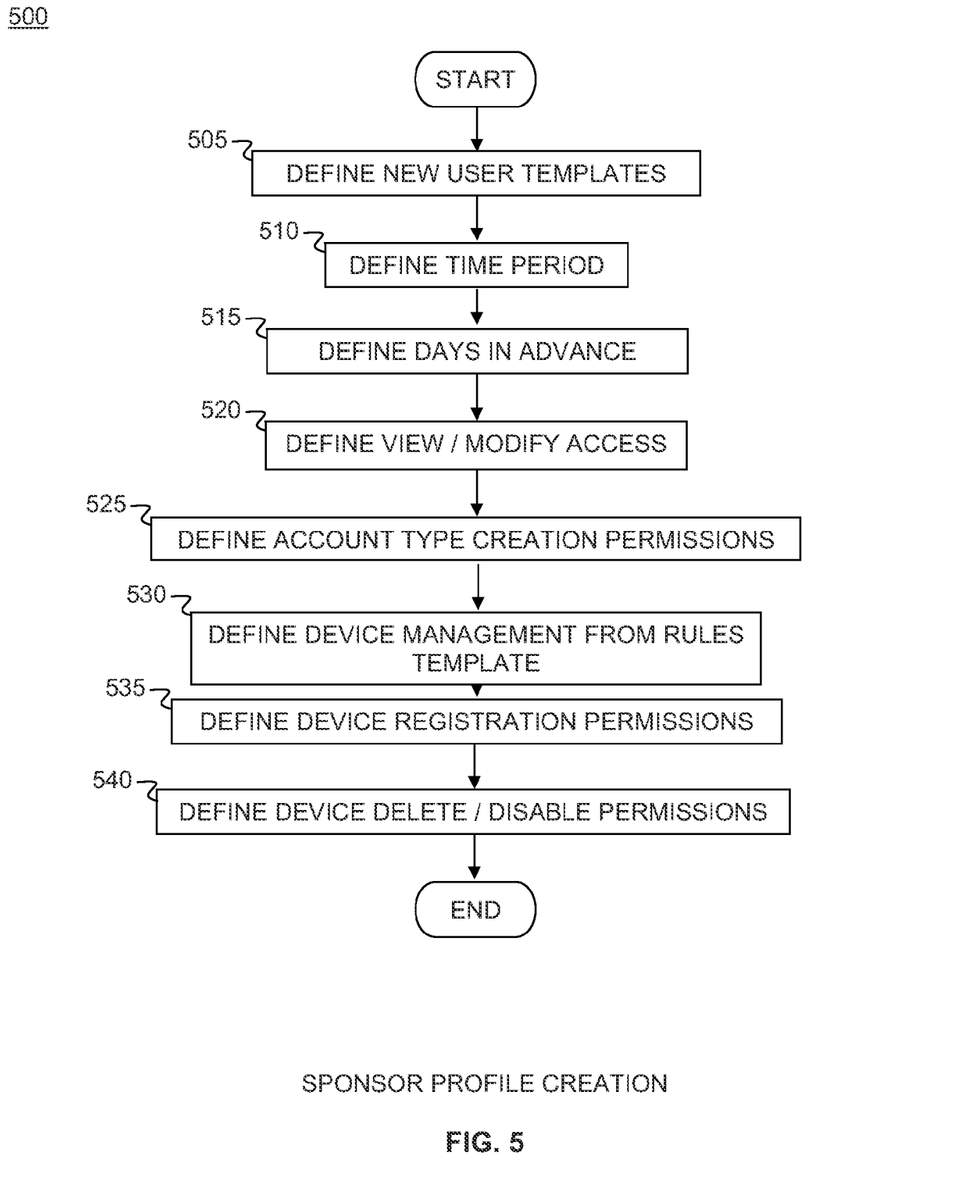
FIG. 5 is a simplified flow chart of a method of creating a Profile for a Sponsor configured in accordance with one embodiment of the present invention.

FIG. 5 depicts a simplified flow chart 500 of a method of creating a Profile for a Sponsor. In embodiments, the Administrator creates a Profile for a Sponsor by defining which new Templates the Sponsor is allowed to use 505, defining the time period of the accounts the Sponsor is allowed to create 510, defining the days in advance the Sponsor is allowed to create accounts 515, defining whether the Sponsor has access to view or modify the accounts they create or accounts others create 520, defining what Types of accounts the Sponsor can create 525, defining which devices the Sponsor can manage based on the Template used to identify the device 530, defining whether the Sponsor can manually register profiled devices 535, and defining whether the Sponsor can delete or disable profiled devices 540. The order of steps is representative only and may be altered.

Feature Descriptions

Categorizing and identifying endpoints requiring network services refers to embodiments' ability detect a new endpoint on the network, such as a device or a user. Once the endpoint has been identified, embodiments have several methods to categorize it, for example, those following.

Network endpoints are categorized based on profiling Templates that use detection methods such as IP Range, port on which services are provided, location, and organization unique identifiers (OUIs) to determine endpoint type.

Temporary network users (TNUs) are categorized based on the Template used to create their accounts in the network access control database. After the account is created, the association with the TNU Template remains.

After network connection, control is maintained over network endpoints for which network services have been provided. Devices are controlled based on where and how they are connected to the network. In embodiments, they may only have access to a certain segment of the network; they may be limited by time of day; and they may be limited as to the resources to which they have access.

Temporary network users are controlled by Roles and Temporary network User Templates which limit access based on time and location. Management of network endpoints requiring network services is delegated based on prior categorization. Associating Templates with Sponsors via Profiles allows Sponsors to manage items covered by works associated Template. Embodiment examples include Sponsor Profiles associated with one or more Templates. Sponsors with a Profile can manage network endpoints that have been identified by the associated Templates.

Network endpoint management is limited based on prior categorization. Profiles are able to limit a Sponsor's access to network endpoints based on the Templates associated with them.

Limited management enhances system security by minimizing the authority given to Sponsors, minimizing opportunities for error and abuse. Limited management also balances the Administrator's workload by offloading management responsibility to, for example, department heads who are familiar with the network endpoints over which they now have responsibility. Audit trail and endpoint activity viewing provide tools to the Administrator and delegated Sponsors to monitor network service use for suspicious activity, balancing network integrity with network access and control.

Guest Manager

The problem of providing controlled temporary network access to Guest users is solved by an Administrator creating one or more Templates which define how the Guests will be controlled and associating these with Sponsor Profiles. In this way, the needed accounts are created for Guests to control Guests' access to the network.

Figure 6:
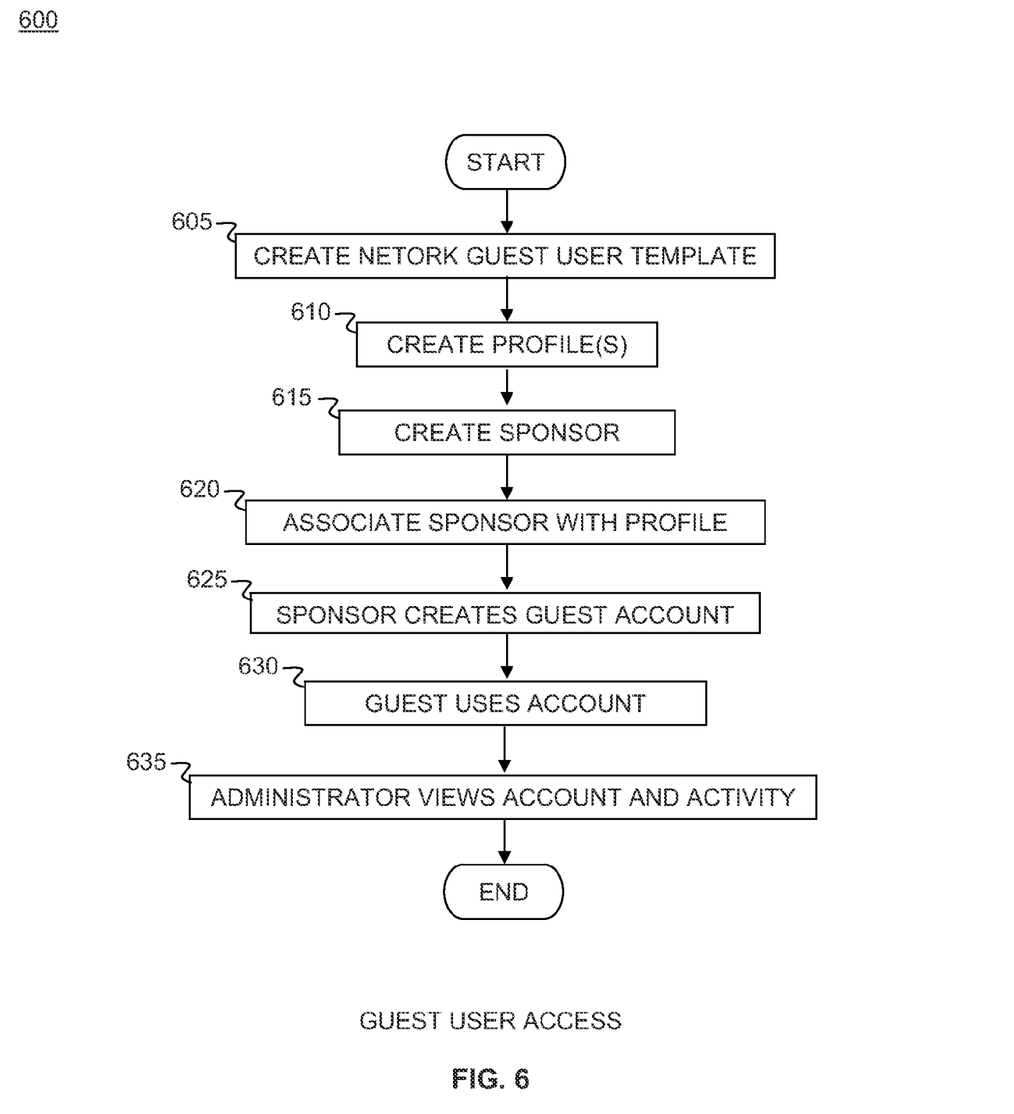
FIG. 6 is a simplified flow chart of the steps of a method for providing temporary network access to a Guest user configured in accordance with one embodiment of the present invention.

FIG. 6 depicts the steps of a method 600 for providing temporary network access to a Guest user. The Administrator creates at least one Guest Template 605. For embodiments, a Guest Template comprises: 1) The time period that Guest users can access the network (time of day and/or overall time limit); 2) The Role Guest users will be assigned which will limit their access to the network; 3) A Scan Policy to enforce compliance of Guests' system before they are allowed on the network; and 4) An authentication method to determine how the Guest will authenticate to the network (for example: LDAP, RADIUS, Local Account). The Administrator creates one or more Profiles 610. In embodiments, the Profile comprises specifications to define: 1) Which Templates the Sponsor is allowed to use; 2) The time period, start time/end time and valid period, of the accounts the Sponsor is allowed to create; 3) The days in advance the Sponsor is allowed to create accounts; 4) Whether the Sponsor has access to view or modify the accounts they create or accounts others create; and 5) What types of accounts Sponsors can create (for example: Individual accounts, conference accounts that can all use the same user name and password or have unique user names and passwords). The administrator creates one or more Sponsors 615 and assigns one or more Profiles to each Sponsor 620. The Sponsor logs in and can create guest accounts 625 using the Templates assigned to their Profile. The Guest uses the account 630 created by the Sponsor to access the network. The Administrator can log in at any time to view the accounts that the Sponsor has created, and to view activity of the Guests using those accounts 635 (including when they have logged in, and what they have accessed).

Device Profiler

The problem of identifying and adding devices such as heart monitors, PDAs, or HVAC systems to the network is solved by an Administrator creating one or more Template rules which identify the attributes of a device and place it in the appropriate management location within the system. Template rules are associated with Sponsors via their Profiles, allowing management of the device. In embodiments, Template rules are created to automatically allow devices on the network with no intervention by the Sponsor. Devices are associated with a Sponsor. This allows the Sponsor to continue managing them, including reporting activities.

Figure 7:
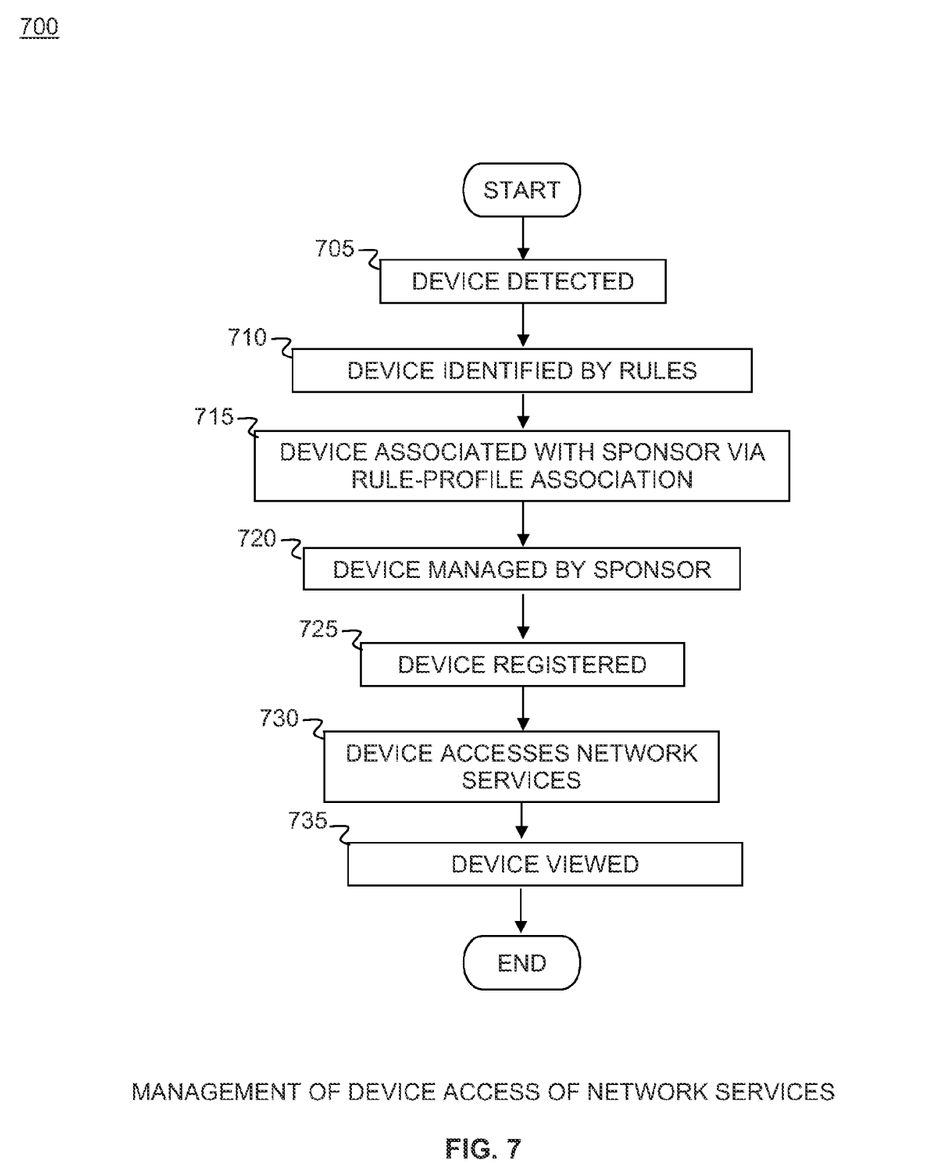
FIG. 7 is a simplified flow chart of the steps of a method for managing network services access by devices configured in accordance with one embodiment of the present invention.

FIG. 7 depicts the steps of a method 700 for managing network services access by devices. A device is detected 705. The device is identified by one or more device identification/placement rules the Administrator created 710. For embodiments, a device identification/placement rule comprises: 1) The time period that the device can access the network (time of day or always); 2) The Role it will be assigned which will control what the device can access and how those resources are accessed; 3) The device Type, such as gaming device, based on data returned from the device; 4) Where and how the device will be managed within the system; and 5) Whether or not to notify the Sponsor that a new device has connected. The device is associated with a Sponsor 715 via association of device identification/placement rules and a Sponsor Profile created by the Administrator. For embodiments, the Profile defines: 1) Which devices the Sponsor can manage based on the Template/rule used to identify the device; 2) Whether the Sponsor can manually register profiled devices; and 3) Whether the Sponsor can delete or disable profiled devices. The Administrator creates one or more Sponsors within the system and assigns one or more Profiles to each Sponsor. The Sponsor logs in and manages profiled devices 720 based on the Template rules used to identify the device. The Sponsor can register devices 725 or, if necessary, delete or disable devices. When devices are registered they can access the network services they need 730. The Administrator or Sponsor can log in at any time to view the devices that the Sponsor is managing, and to view activity 735 of the devices. In embodiments, viewable activity of the devices includes: 1) When the device connected; 2) Device Type; 3) Device Location; 4) Device MAC Address and IP Address; and 5) What is connected to the device.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for control of computer network resources connected to a computer network supporting network endpoints by delegating control from a network administrator to at least one sponsor comprising the steps of:
creating templates for users and devices of said computer network by said network administrator at an administrator account on a workstation connected to said computer network;
creating profiles used to control said resources of said computer network;
associating said templates with said profiles;
creating at least one said sponsor by said network administrator;
associating, by said network administrator, at least one of said profiles with said sponsor;
delegating, by said network administrator, network management administrative privileges to said sponsor,
transferring responsibility for said users and devices from said network administrator to said sponsor when said template of said users and devices is associated with said profile of said sponsor; and
controlling of said computer network resources by said sponsor, using said templates assigned to said sponsor by said network administrator, wherein said sponsor is constrained by said network administrator by said at least one associated profile, said sponsors not having network management administrative privileges over said network administrator.

2. The method of claim 1, wherein said step of creating templates comprises:
detecting IP range, port on which services are provided, location, and organization unique identifiers (OUIs), whereby endpoint type is determined.

3. The method of claim 1, wherein said step of creating profiles comprises:
defining which of said templates said sponsor is allowed to use;
defining time period of accounts said sponsor is allowed to create;
defining days in advance said sponsor is allowed to create accounts;
defining whether said sponsor has access to view or modify said accounts they create or accounts others create;
defining what types of accounts said sponsor can create;
defining which devices said sponsor can manage based on template used to identify said device;
defining whether said sponsor can manually register profiled devices; and
defining whether said sponsor can delete or disable profiled devices, wherein said profile defines scope and limitations of said sponsor's control.

4. The method of claim 1, wherein said step of associating said templates with said profiles comprises:
storing identifiers of said associated templates and said associated profiles for said sponsor.

5. The method of claim 1, wherein said step of creating at least one said sponsor comprises:
said network administrator identifying a type attribute of at least one network user with administrative privileges as sponsor.

6. The method of claim 1, wherein said step of associating at least one of said profiles comprises:
storing identifier of at least one said associated profile in network account attribute of said associated sponsor.

7. The method of claim 1, wherein said step of controlling of said network resources by said sponsor comprises:
creating guest accounts using said templates in said sponsor's at least one profile;
limiting network access by segment;
limiting network access by resource;
limiting network access based on connection method and location; and
limiting network access by time and location.

8. The method of claim 1, wherein said sponsor is authorized to create guest accounts.

9. The method of claim 8, wherein said template is a guest template comprising:
- time period that guest user can access said network;
- role said guest user will be assigned, whereby access to said network is limited;
- scan policy to enforce compliance of guest's system before allowed on said network; and
- authentication method to determine how said guest will authenticate to said network.

10. The method of claim 1, wherein said profile comprises:
- specifications defining templates said sponsor is allowed to use;
- time period of accounts said sponsor is allowed to create;
- days in advance said sponsor is allowed to create accounts;
- permissions for said sponsor access to view or modify accounts they create or accounts others create; and
- types of accounts said sponsor can create.

11. The method of claim 1, wherein endpoint control delegation comprises:
- discovering network endpoints requiring services from said network;
- identifying said network endpoints;
- categorizing said identified network endpoints;
- limiting management permission for said categorized network endpoints based on said endpoint categories; and
- delegating management including said limitations to said sponsor, whereby said network endpoints are controlled by said sponsor.

12. The method of claim 1, wherein temporary network users (TNUs) are categorized based on template used to create said TNUs' accounts in an access control database of said network, wherein association with said TNU template remains after said account is created.

13. The method of claim 1, further comprising:
- detecting a device; and
- identifying said device by at least one device identification/placement rule created by said network administrator.

14. The method of claim 13, wherein said device rule comprises:
- time period that said device can access said network;
- role said device will be assigned;
- device type, based on data returned from said device;
- where and how said device will be managed within said network; and
- whether to notify said sponsor that a new device has connected.

15. A system for control of network resources supporting network endpoints by delegating control from a network administrator to at least one network sponsor comprising:
- in a network database, creating template records for endpoints of said network by said network administrator;
- in said network database, creating at least one profile used to control said endpoints;
- associating said templates with said profiles;
- in said network database, creating at least one sponsor record by said network administrator;
- associating at least one of said profiles with said sponsor record by said network administrator;
- delegating, by said network administrator, network management administrative privileges to said sponsor,
- transferring responsibility for said endpoint from said network administrator to said sponsor when said template of said endpoint is associated with said profile of said sponsor; and
- by executing instructions in a microprocessor, controlling of said network resources by said sponsor, using said templates assigned to said sponsor by said network administrator, wherein said sponsor is constrained by said network administrator by said at least one associated profile.

16. The system of claim 15, wherein template rules are created to automatically allow devices on said network with no intervention by said sponsor.

17. The system of claim 15, wherein said profile comprises:
- identification of devices said sponsor can manage based on a template/rule used to identify said device;
- identifying if said sponsor can manually register profiled devices; and
- specifying if said sponsor can delete or disable profiled devices.

18. The system of claim 15 further comprising:
- said sponsor profile enabling said sponsor to view devices managed by said sponsor.

19. The system of claim 18, wherein said viewing comprises:
- time said device connected;
- type of said device;
- location of said device;
- MAC address of said device;
- IP address of said device; and
- components connected to said device.

20. An apparatus for control of network resources supporting network endpoints by delegating control from a network administrator to at least one network sponsor comprising:
- a network database containing template records for endpoints of said network, wherein said template comprises a set of rules or patterns defining scope of IT task, limitations of said endpoint and identification of an association between said endpoint and said sponsor;
- in said network database at least one profile used to control said endpoints;
- at least one microprocessor executing instructions associating said templates with said profiles;
- in said network database at least one sponsor record;
- at least one microprocessor executing instructions associating at least one of said profiles with said sponsor record;
- at least one microprocessor executing instructions delegating, by said network administrator, network management administrative privileges to said network sponsor,
- transferring responsibility for said endpoint from said network administrator to said network sponsor when said template of said endpoint is associated with said profile of said sponsor record of said network sponsor; and
- at least one microprocessor executing instructions controlling said network resources by said sponsor, using said templates assigned to said sponsor by said network administrator, wherein said sponsor is constrained by said network administrator by said at least one associated profile.

* * * * *